(12) United States Patent
   Anantharaman

(10) Patent No.: US 11,089,608 B2
(45) Date of Patent: Aug. 10, 2021

(54) SYSTEM AND METHOD FOR WIRELESS COMMUNICATION

(71) Applicant: Ikabit, Inc., El Dorado Hills, CA (US)

(72) Inventor: Divya Anantharaman, El Dorado Hills, CA (US)

(73) Assignee: Ikabit, Inc., El Dorado Hills, CA (US)

( * ) Notice: Subject to any disclaimer, the term of this patent is extended or adjusted under 35 U.S.C. 154(b) by 0 days.

(21) Appl. No.: 15/672,283

(22) Filed: Aug. 8, 2017

(65) Prior Publication Data

US 2018/0063859 A1    Mar. 1, 2018

Related U.S. Application Data

(63) Continuation-in-part of application No. 15/255,131, filed on Sep. 1, 2016, now Pat. No. 9,788,144.

(51) Int. Cl.
| | |
|---|---|
| *H04W 72/12* | (2009.01) |
| *H04L 29/08* | (2006.01) |
| *H04W 4/80* | (2018.01) |
| *H04W 88/06* | (2009.01) |
| *H04W 8/00* | (2009.01) |
| *H04W 48/16* | (2009.01) |
| *H04W 84/12* | (2009.01) |
| *G10L 15/22* | (2006.01) |
| *H04W 4/12* | (2009.01) |

(52) U.S. Cl.
   CPC ......... *H04W 72/1215* (2013.01); *H04L 67/04* (2013.01); *H04L 67/12* (2013.01); *H04L 67/2823* (2013.01); *H04W 4/80* (2018.02); *G10L 15/22* (2013.01); *G10L 2015/223* (2013.01); *H04W 4/12* (2013.01); *H04W 8/005* (2013.01); *H04W 48/16* (2013.01); *H04W 84/12* (2013.01); *H04W 88/06* (2013.01)

(58) Field of Classification Search
   CPC .... H04W 72/1215; H04W 4/80; H04L 67/04; H04L 67/12; H04L 67/2823
   See application file for complete search history.

(56) References Cited

U.S. PATENT DOCUMENTS

| | | | |
|---|---|---|---|
| 9,769,686 B2 * | 9/2017 | Kang | H04W 24/08 |
| 10,129,690 B2 * | 11/2018 | Lee | H04W 4/80 |
| 2009/0207893 A1 * | 8/2009 | Leutgeb | H04B 5/0037 |
| | | | 375/219 |
| 2010/0271983 A1 | 10/2010 | Bryant | |
| 2010/0303047 A1 * | 12/2010 | Ibrahim | H04W 4/02 |
| | | | 370/338 |
| 2013/0178160 A1 * | 7/2013 | Wang | H04W 48/10 |
| | | | 455/41.2 |

(Continued)

OTHER PUBLICATIONS

Bluetooth Technology Website, and related links. Available at https://www.bluetooth.com/. Accessed Aug. 12, 2016.

(Continued)

*Primary Examiner* — Donald L Mills
(74) *Attorney, Agent, or Firm* — Bryan E. Repetto; Repetto Law, P.C.

(57) ABSTRACT

Disclosed is a wireless communication system and method for its use. In certain embodiments, Wi-Fi packets and Bluetooth packets are transmitted between multiple devices including pods, smartphones, computing devices, and appliances. Data transmitted over the system may include notifications and commands generated by users.

32 Claims, 13 Drawing Sheets

(56) References Cited

U.S. PATENT DOCUMENTS

| | | |
|---|---|---|
| 2013/0346208 A1 | 12/2013 | Bouret et al. |
| 2014/0057652 A1 | 2/2014 | Palanki et al. |
| 2014/0128032 A1 | 5/2014 | Muthukumar |
| 2014/0159877 A1 | 6/2014 | Huang |
| 2014/0330435 A1* | 11/2014 | Stoner ................. H04L 12/2816 700/275 |
| 2015/0237150 A1 | 8/2015 | Sweeney et al. |
| 2015/0264138 A1* | 9/2015 | Watts, Jr. ............ H04L 67/1095 709/203 |
| 2015/0319029 A1* | 11/2015 | Abraham ............ H04L 61/2592 370/310 |
| 2015/0365986 A1* | 12/2015 | Lee ....................... H04W 76/16 370/329 |
| 2016/0036958 A1 | 2/2016 | Logan |
| 2016/0227354 A1* | 8/2016 | Zhao ....................... H04B 1/48 |
| 2016/0234797 A1* | 8/2016 | Park ................... H04W 56/001 |
| 2016/0378082 A1* | 12/2016 | Fisher .................. G05B 15/02 700/275 |
| 2017/0003931 A1 | 1/2017 | Dvortsov |
| 2017/0026504 A1 | 1/2017 | Nichols |
| 2017/0105190 A1 | 4/2017 | Logan |
| 2017/0280495 A1* | 9/2017 | Zhang ................... H04W 76/19 |
| 2017/0309142 A1 | 10/2017 | Phillips |
| 2017/0316674 A1 | 11/2017 | Candy |
| 2017/0318419 A1 | 11/2017 | Sutherland |
| 2018/0158288 A1 | 6/2018 | Logan |
| 2019/0034051 A1* | 1/2019 | Jeon .................... G06F 3/04847 |
| 2019/0132396 A1* | 5/2019 | Finnegan ................ H04L 67/34 |

OTHER PUBLICATIONS

Bluetooth technology basics. Available at https://www.bluetooth.com/what-is-bluetooth-technology/bluetooth-technology-basics. Accessed Aug. 12, 2016.

Bluetooth core specification. Available at https://www.bluetooth.com/specifications/bluetooth-core-specification. Accessed Aug. 12, 2016.

Wi-Fi Specifications. Available at http://www.wi-fi.org/discover-wi-fi/specifications. Accessed Aug. 12, 2016.

* cited by examiner

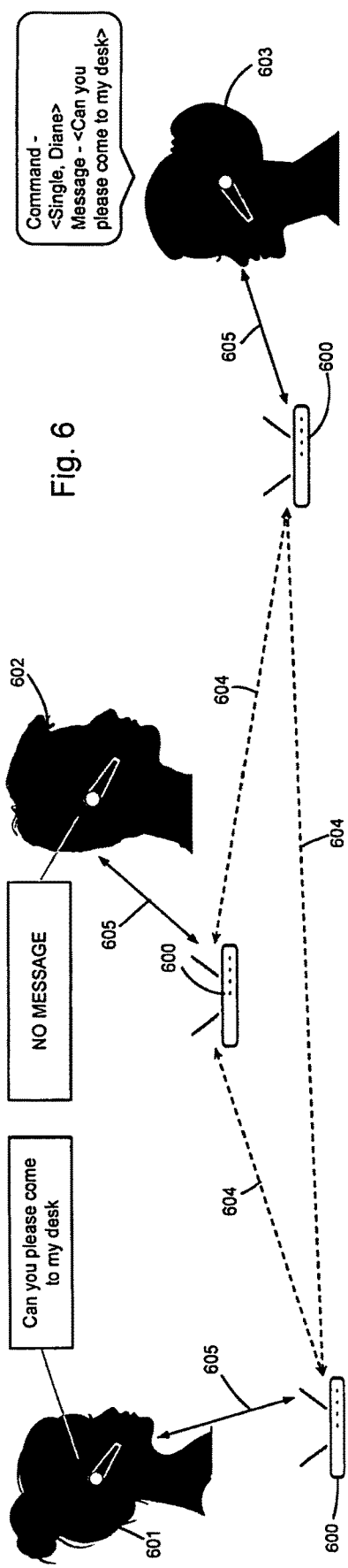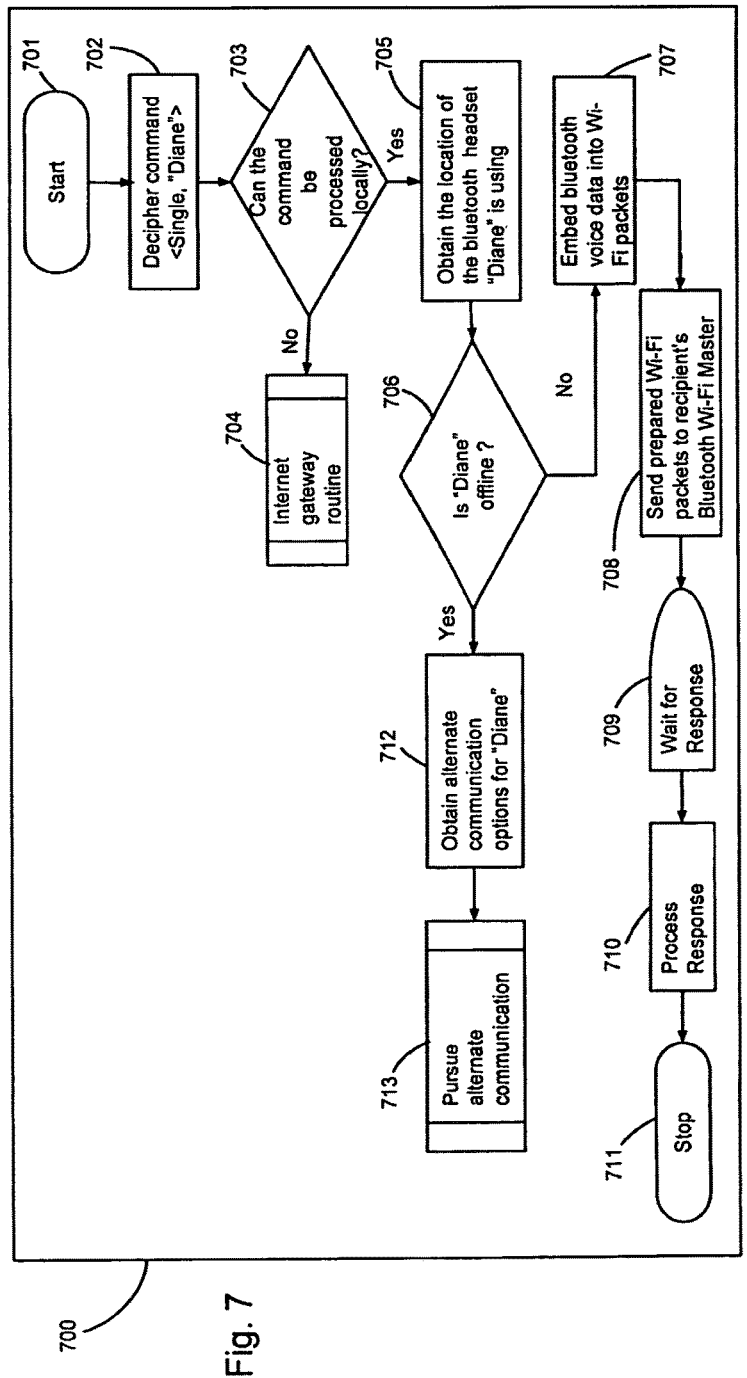

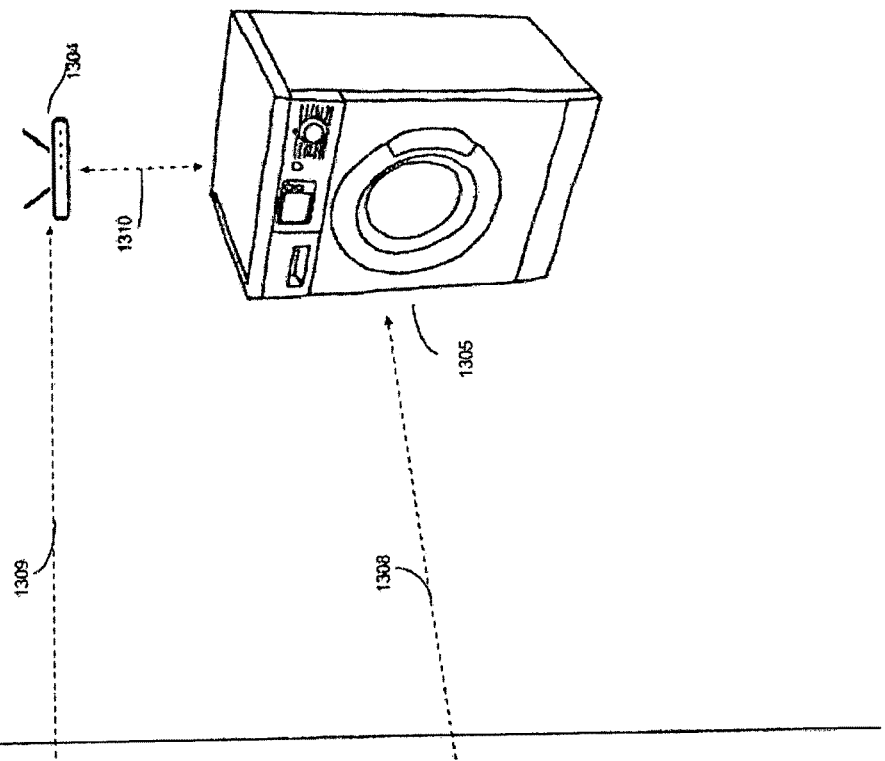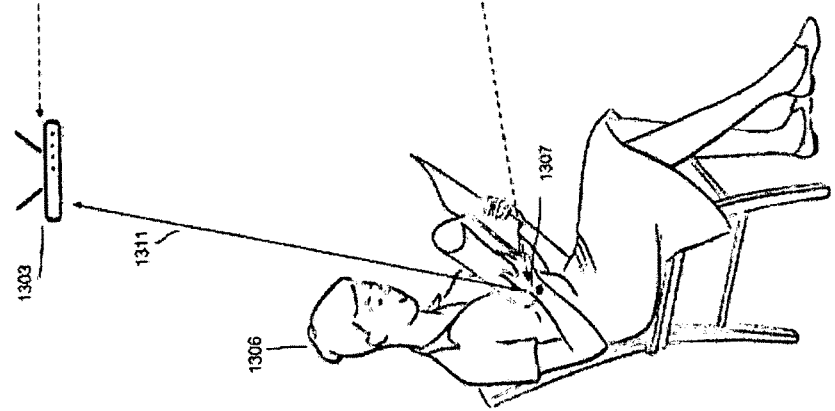
Fig 13

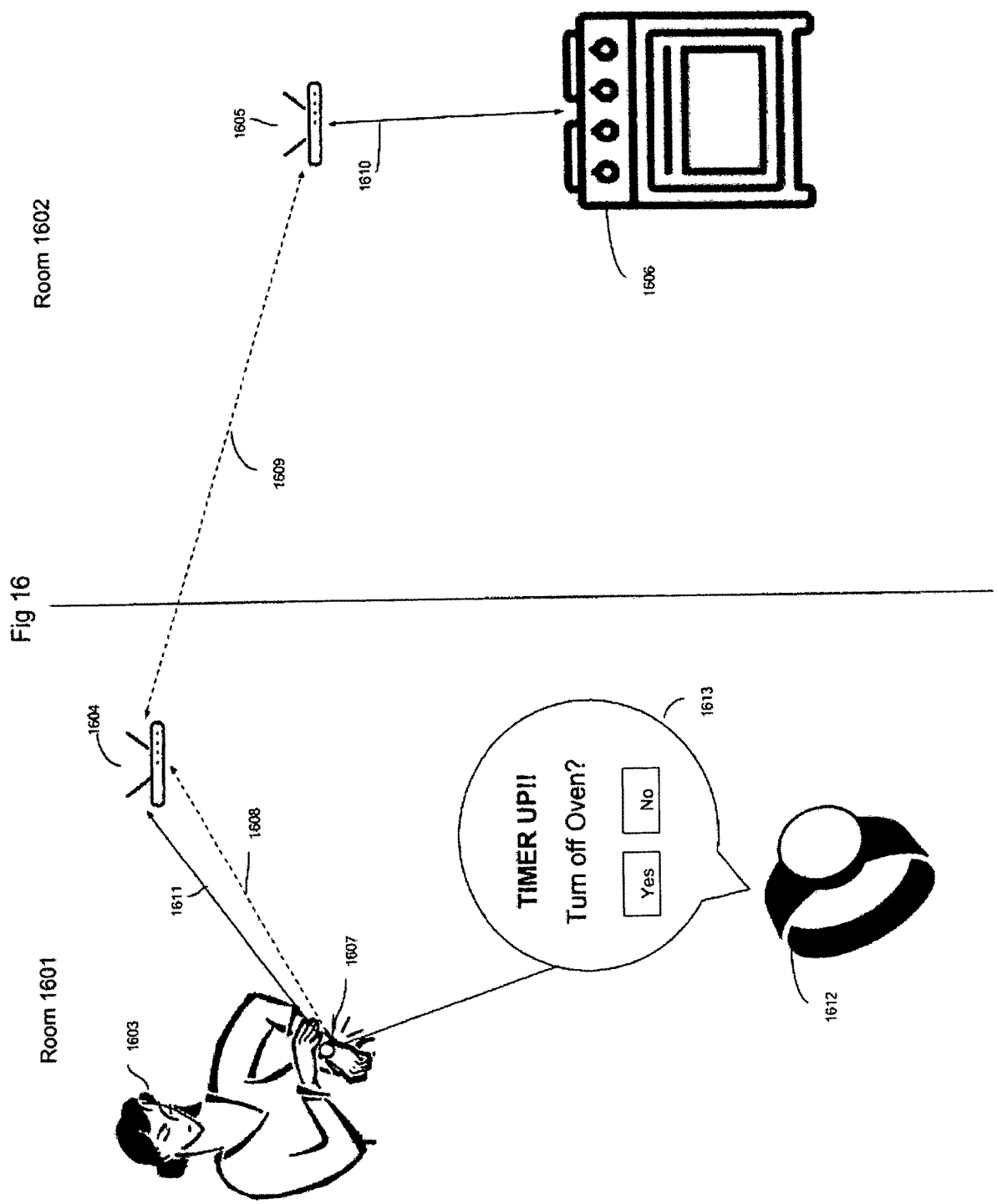

SYSTEM AND METHOD FOR WIRELESS COMMUNICATION

PRIORITY CLAIM

This application is a continuation-in-part of, and claims the benefit of, U.S. application Ser. No. 15/255,131 filed on Sep. 1, 2016. The aforementioned application is incorporated herein by reference.

BACKGROUND

Wireless communication modalities present numerous challenges to users. Devices, such as pagers and handheld radios are bulky, expensive, and often lack hands-free functionality. These limitations are a challenge to users who desire lightweight, convenient, cheaper devices with true hands-free functionality. The disclosed system utilizes Bluetooth protocol over a wireless network and provides many of the same features available in a pager or a handheld radio, while adding additional functionality and a lightweight alternative to handheld radios. Further, the disclosed system and method comprise novel uses and integration of both Wi-Fi and Bluetooth protocols to facilitate communication among multiple users.

The disclosed communication system utilizes either Wi-Fi or cellular network to transmit messages among users. Present-day Bluetooth headsets consume very low power and can easily last an entire work day. Although pagers are dated technology, they are still in use because they are reliable and there is not a reliable alternative for many applications.

Bluetooth technology alone, is not without limitation. Most Bluetooth devices in use have a limited range of approximately thirty feet. While this is typically adequate for communication between devices in close proximity, it is not sufficient to enable communication over long distances. Over longer distances, network communication over a computer network, coupled to the internet, is necessary. A device having both a Bluetooth radio and a Wi-Fi radio will be able to facilitate this type of communication. Bluetooth signals can be used to communicate with devices in close proximity having Bluetooth radios, while a Wi-Fi radio can facilitate this kind of communication over longer distances, with more distant devices.

Wi-Fi is a wireless standard through which devices having a Wi-Fi radio are able to connect to a Local Area Network (LAN), and thereby, connect to other networks or the internet. Wi-Fi is the tradename for the IEEE 802.11 standard. In contrast to Bluetooth, Wi-Fi generally requires more complex configuration to pair devices, and is better suited when higher speeds and more bandwidth is required. Combining Bluetooth and Wi-Fi capabilities into each pod allows for the pod to receive larger volumes of data, while having the capability to easily configure a device, such as a Bluetooth headset, to receive audio data, at relatively short ranges.

BRIEF SUMMARY

Disclosed is a communication system and method, utilizing Bluetooth and Wi-Fi protocols. The system comprises various pod devices connected together to form a small local network, with the pod devices communicating with each other using Wi-Fi signals, and communicating over Bluetooth signals with one or more Bluetooth enabled devices in this network. As Bluetooth signals are limited in range, Bluetooth is used only to communicate with Bluetooth devices in close proximity. Each pod comprises a microprocessor with necessary onboard memory running a small operating system and has a Bluetooth radio, a Wi-Fi radio and a basic speech recognition system. This device can be coupled to either AC or DC power source depending on the usage and is capable of converting Bluetooth data to Wi-Fi data and vice versa to facilitate communication between the two kinds of wireless devices. Each pod is capable of handling multiple Bluetooth slave devices at the same time and is capable of receiving voice commands from a wireless headset. In such a configuration, the pod serves as a master, and each Bluetooth enabled device coupled to the pod serves as a slave. Furthermore, the pod is also capable of transmitting data over Wi-Fi to an internet gateway that could be coupled to a more sophisticated speech recognition system to process more complicated speech recognition. In certain embodiments, the system comprises one or more appliances. In such embodiments, data is transmitted between the appliance and pods via Bluetooth packets or Wi-Fi packets. This data can be used to inform a user of a state or condition of the appliance, and allows the user to control or alter the function of the appliance.

FIGURES

FIG. 6 illustrates an embodiment of a transmission of a voice message to a single user having a Bluetooth enabled device.

FIG. 7 illustrates an embodiment of a method for transmitting a message to a single user having a Bluetooth enabled device.

FIG. 13 illustrates an embodiment of a system, wherein data is transmitted between a user and an appliance, wherein a user has a device transmitting and receiving data packets directly to the appliance, and data packets to the appliance via one or more pods.

FIG. 16 illustrates an embodiment of a system wherein a user receives an alert from an appliance, and may transmit a command to the appliance.

DETAILED DESCRIPTION

Figure 1:
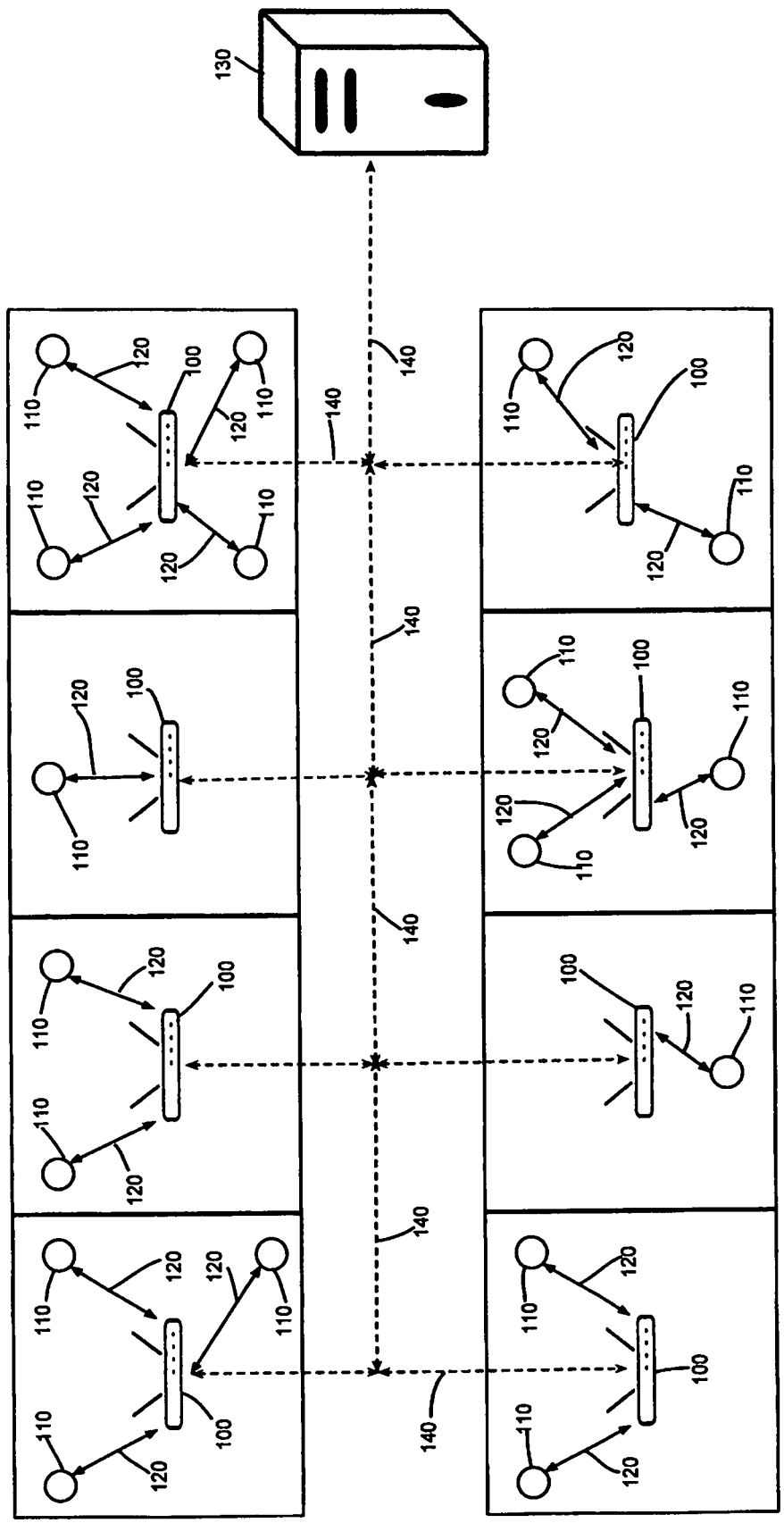
FIG. 1 is an illustration of an embodiment of system wherein Bluetooth enabled devices are coupled to a pod, with each pod being coupled to multiple pods via Wi-Fi signals, and each pod is coupled to an internet gateway.
Figure 10:
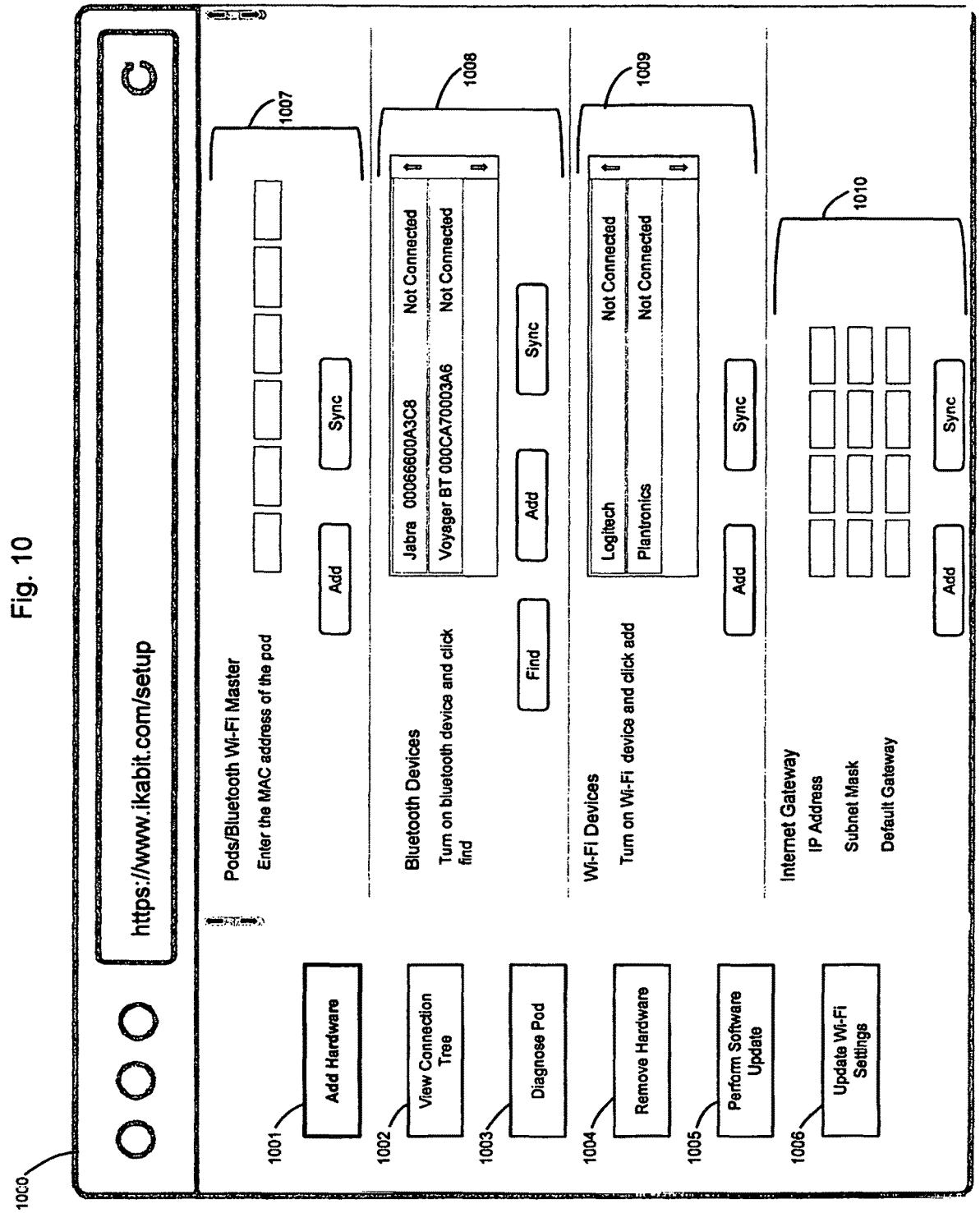
FIG. 10 illustrates an embodiment of a user interface for administrative functions of the disclosed system.

Disclosed is a system and method for transmitting data among users, using wireless devices over a computer network. FIG. 1 illustrates a representative embodiment of such a system. Each user has a Bluetooth enabled device 110 or alternatively, a Wi-Fi enabled device. In certain embodiments, the Bluetooth enabled device is a wireless headset, but any Bluetooth enabled device, with the ability to send and receive audio messages, may be utilized. Bluetooth signals 120 are transmitted between the pod 100 and a Bluetooth enabled device 110. The system architecture is comprised of a network of one or more pods 100. Each pod is equipped with both a Bluetooth radio and a Wi-Fi radio, and is capable of transmitting data over both Bluetooth and Wi-Fi protocols. Each pod also comprises computer functionality, including non-transitory computer readable media, digital storage, and a processor. The Bluetooth enabled devices have a limited range, typically approximately thirty feet in the most common application. In certain embodiments, especially in embodiments in which the system will be deployed over a large area, multiple pods are disposed at a distance to ensure the Bluetooth enabled devices are always in range of pod in a given area. In certain embodiments, pods are situated at a distance of, or less than, approximately thirty feet from each other, to ensure at least one pod is always in range of a Bluetooth enabled device. In certain situations, it may be necessary to position pods in closer range to each other. For example, in environments where the system will cover an area with multiple walls in close proximity, or a building having multiple floors, pods may be positioned closer together. In certain embodiments, each pod is coupled to an internet gateway 130. When coupled to an internet gateway 130, the system may utilize complex speech recognition systems, and other services and software accessible over the internet. Each pod maintains a list of the each of the other pods on the system and the Bluetooth enabled devices 110 connected to the pod. Additionally, each pod 100 locally stores a directory of all of the Bluetooth enabled devices that are authorized to receive data on the network. The directory is updated as new devices are added to the system or existing devices are removed from the system. In certain embodiments, a system administrator authorizes each Bluetooth enabled device to access the system. A user interface, as illustrated in FIG. 10, is used by administrators to authorize access to the system. Bluetooth enabled devices that have not been authorized by an administrator cannot access the system or communicate with a pod 100. When a new pod or Bluetooth enabled device is added or removed from the system, a signal 140 is transmitted to each pod, thereby updating each locally stored directory. Signals 140 transmitted between pods are Wi-Fi signals. Additionally, signals transmitted between the pods 100 and the internet gateway 130 are Wi-Fi signals. The security of the system is ensured because the pods will only connect to previously authorized pods, gateways, or Bluetooth enabled devices. FIG. 1 illustrates various communication patterns among Bluetooth enabled devices 110 and pods 100. When a user transmits a message through a first Bluetooth enabled device 110, the message is transmitted as a Bluetooth signal 120 to a first pod 100. The first pod 100, can then transmit the message to a second Bluetooth enabled device 110 via a Bluetooth signal 120, provided the second Bluetooth enabled device is within range of the first pod. If the second Bluetooth enabled device is not within range of the first pod, the message is transmitted via a Wi-Fi signal 140 to a second pod 100, in range of, and connected to, the second Bluetooth enabled device 110. In certain embodiments, the message can also be transmitted from the first Bluetooth enabled device, via a Bluetooth signal 120, to a first pod 100, and then, via a Wi-Fi signal 140, to an internet gateway 130. The internet gateway can then transmit the message to any device coupled to the internet, or to another system utilizing the same protocol as the system disclosed herein.

Figure 2:
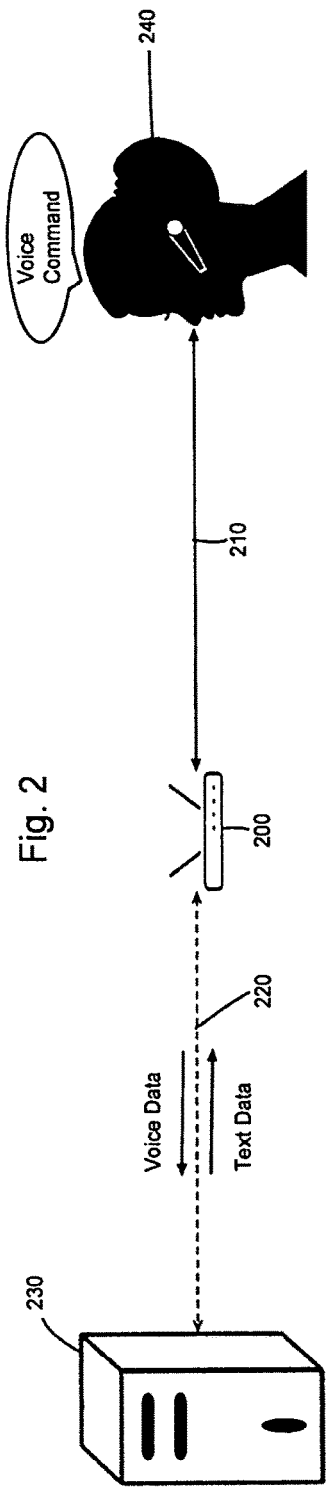
FIG. 2 is an illustration of an embodiment of a transmission of a voice command to an internet gateway via a pod.
Figure 3:
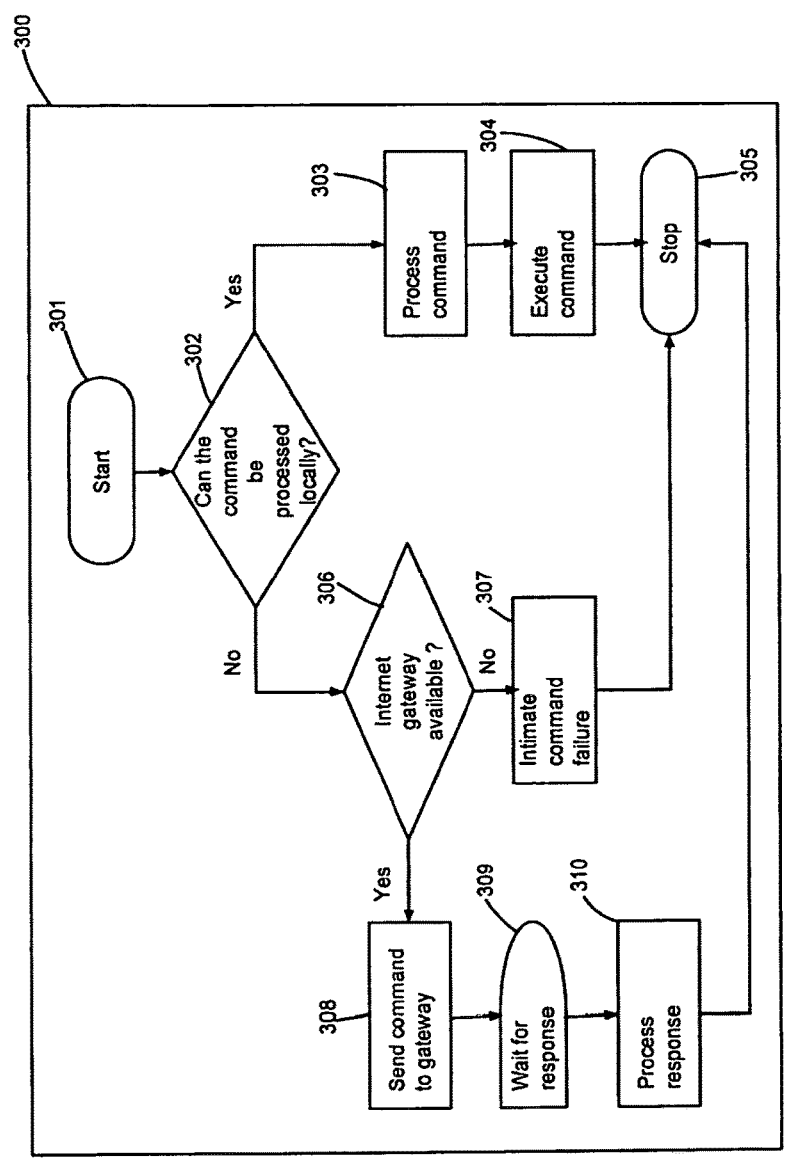
FIG. 3 illustrates an embodiment of a method for processing voice commands.

FIG. 2 illustrates the transmission of voice data and text data between a pod, an internet gateway 230, and a Bluetooth enabled device 240 and FIG. 3 illustrates an embodiment of a method 300 in which a voice command is processed. In FIG. 2, a user verbally gives a voice command to the Bluetooth enabled device 240. The command is transmitted to a pod 200 via a Bluetooth signal 210. Data, which may comprise voice data, is transmitted to an internet gateway 230 via a Wi-Fi signal 220. Alternatively, text or voice data may be exchanged between the pod 200 and internet gateway 230. Data is transmitted back to the Bluetooth enabled device 240 via a Bluetooth signal 210. In certain embodiments, data transmitted to the Bluetooth enabled device will be voice data, but in alternative embodiments, text data may be transmitted to the Bluetooth enabled device, provided the Bluetooth enabled device is capable of receiving such data. Although voice data is described in certain embodiments, any data may be transmitted in the same manner as voice data and non-voice data transmission can be transmitted over the same architecture and can utilize the same methods disclosed herein.

When a voice command is generated 301, non-transitory, computer-readable instructions stored on the pod, determine if the command can be processed locally 302. If the command can be processed locally, the command is processed 303, executed 304, and the process is complete 305. When a command is processed locally, data will be transmitted from the pod to a Bluetooth enabled device connected to the network, without data being first transmitted to an internet gateway. If, the command cannot be processed locally, a determination will be made, if an internet gateway is available 306. If no internet gateway is available, the command fails 307, and the process ends 305. If an internet gateway is available, the command is sent to the internet gateway 308, there is a brief wait time for a response 309, and the response is processed 310. At this point, the voice data is converted into text data. The data can then be sent to devices not capable of sending or receiving voice messages. The process is then complete 305.

Figure 4:
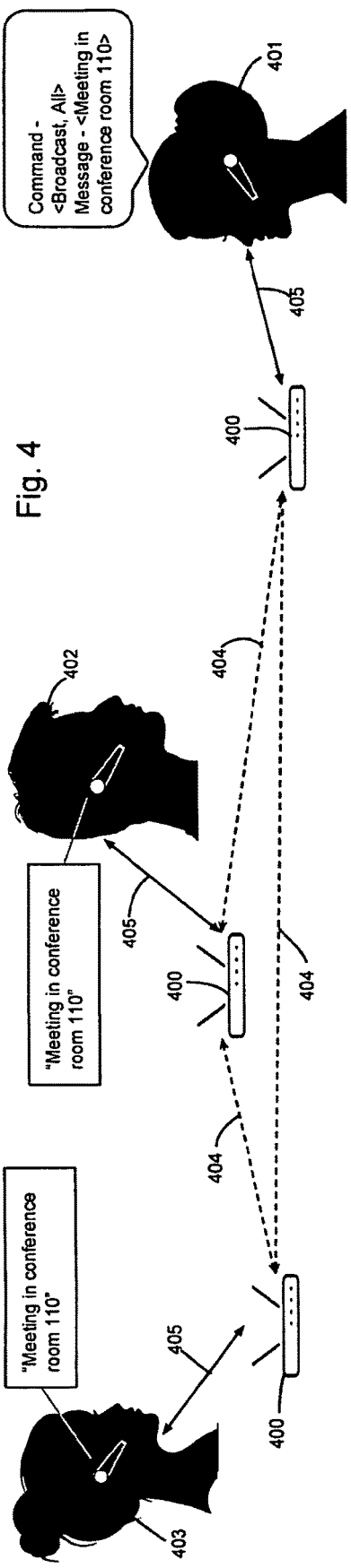
FIG. 4 is an illustration of an embodiment of a transmission of a voice message to multiple users having a Bluetooth enabled device.

A voice message can be broadcast to multiple Bluetooth enabled devices, as illustrated by FIG. 4. In certain embodiments, a first user having a Bluetooth enabled device 401 may transmit a voice message to a second user having a Bluetooth enabled device 402 and a third user having a Bluetooth enabled Device 403. In such embodiments, a first user 401 may initiate the transmission of a voice message either by pushing a button on the Bluetooth enabled device and then speaking a command, or by speaking the command which could have a format of <Command><Recipient><Message>. For example, a first user 401 could say "Voice Broadcast" with recipient as "All", followed by the message and this voice data is transmitted as Bluetooth packets 405 to the pod 400 coupled to the first user's Bluetooth enabled device. The pod 400 which has a basic speech recognition system to decode the <Command><Recipient> deciphers this data and then goes about finding "All" other Bluetooth enabled devices on the network to transmit the message sent by the first user to all devices on the network. If the destination devices are not coupled to the same pod, the pod 400 then embeds this voice data into Wi-Fi packets and sends the data 404 to other pods where the recipient devices are connected. The recipient pods 400 receives the Wi-Fi packets, extracts Bluetooth data from the Wi-Fi packets, and sends the Bluetooth packets to the required Bluetooth enabled devices. In certain embodiments, the pod is equipped with a recipient directory which can be used to send messages to a certain "group" or to "multiple" people in the recipient directory. As illustrated by way of example in FIG. 4, a first user having a Bluetooth enabled device 401 transmits a voice message "meeting in conference room 110" to a second user having a Bluetooth enabled device 402 and a third user having a Bluetooth enabled device 403.

Figure 5:
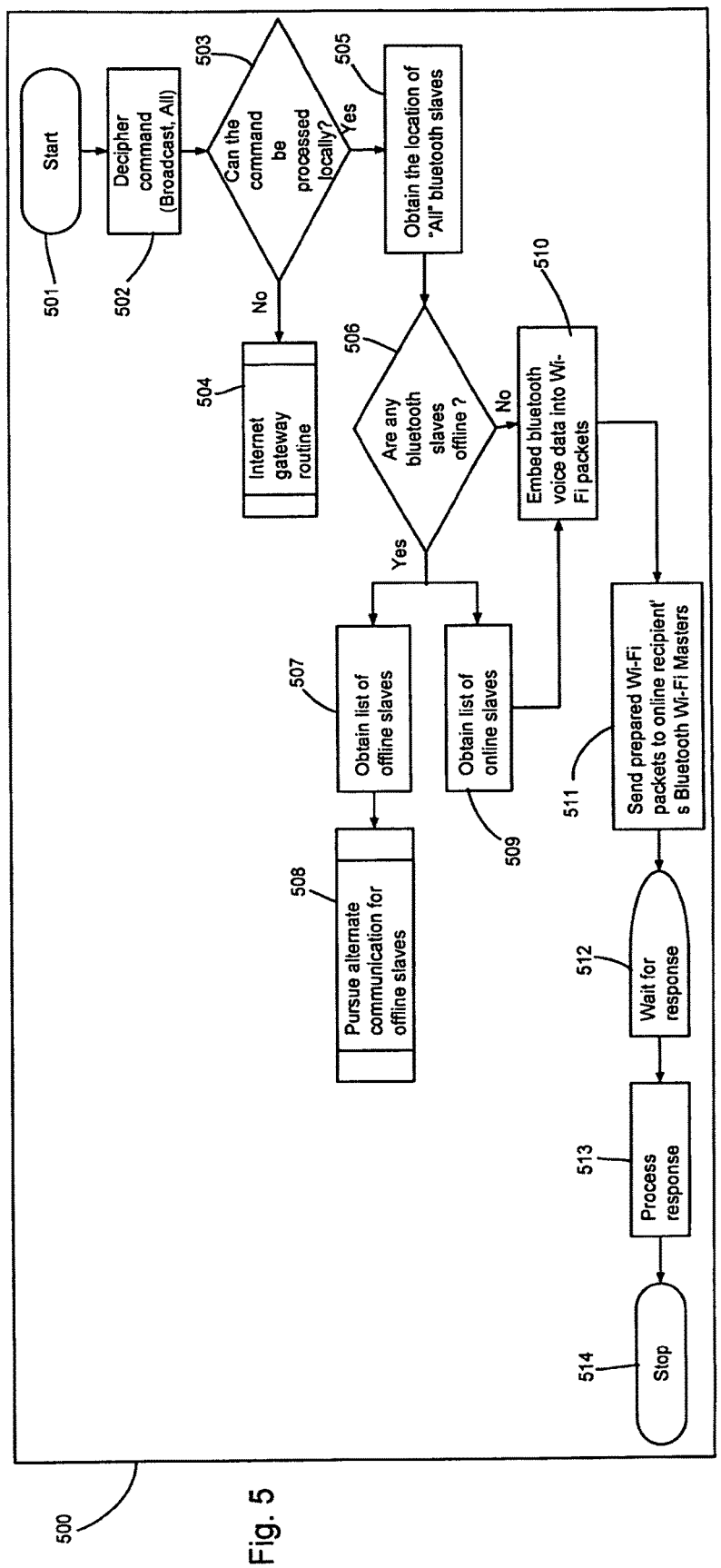
FIG. 5 illustrates an embodiment of a method for transmitting a message to multiple Bluetooth enabled devices.

FIG. 5 illustrates a representative embodiment of the method 500 that enables the system illustrated in FIG. 4. The process begins 501 when a command is initiated by a first user having a Bluetooth enabled device 502. The command is deciphered on the pod, and non-transitory, computer readable instructions residing on the pod determine if the command can be processed locally 503, with data being transferred in the same format received, without being converted. If the command cannot be processed locally, the data will be transmitted to an internet gateway as Wi-Fi data 504. If the data can be processed locally, the location of all Bluetooth enabled devices, intended to be recipients of the data, is obtained 505. For clarity, the term "slave" is used interchangeable with the term "Bluetooth enabled device". A determination is then made as to whether any of the Bluetooth enabled devices are offline 506. If there are devices that are offline, a list is obtained of online devices 509. A list is also obtained of the offline devices 507 and alternative means for communication are pursued for offline devices 508. Bluetooth voice data is then converted to Wi-Fi packets for online devices 510. Wi-Fi packets are then transmitted to pods to which a recipient's Bluetooth enabled device is connected 511. After a waiting period for a response 512, a response is processed 513 and the process is concluded 514.

FIG. 6 illustrates an embodiment of the system wherein a voice message is transmitted from a first user having a Bluetooth enabled device 603, to a second user having a Bluetooth enabled device 601. In this embodiment, the voice message is transmitted to a single user having a Bluetooth enabled device, while excluding other users having a Bluetooth enabled device on the system. When the first user with a Bluetooth enabled device 603 wants to send a message to the second user with a Bluetooth enabled device 601, the first user issues a command by either pushing a button and verbally saying a command, or verbally saying a command (for example, "Single" to indicate the message is to be transmitted to a single user) followed by the recipient name and then the message. The means of issuing a command, either by pushing a button or only by verbally stating a command, depends on the individual Bluetooth enabled device. The pod 600 connected to the first user's Bluetooth enabled device then decodes the message to determine that the message is being sent to a single person, it then searches the locally stored address book to determine which Bluetooth enabled device ID is associated with this name and then sends out a broadcast message 604, in the form of a Wi-Fi packets, to all the pods on the system to determine where the second user's Bluetooth enabled device 601 is located. The pod 600 then embeds the Bluetooth voice data into Wi-Fi packets 604 and sends the message to the recipient pod 600 which extracts the Bluetooth packets from the Wi-Fi packets received, and delivers it to the second user's Bluetooth enabled device 601.

FIG. 7 illustrates an embodiment of a method 700 for transmitting a message to a single user having a Bluetooth enabled device. The method begins 701 with a first user identifying a second user to receive the message, and a first pod deciphering the message 702. In this example, "Diane" is the second user, and intended recipient of the message. Non-transitory, computer readable instructions residing on the pod determine if the command can be processed locally 703, without the data being converted to another format (for example, text). If the command cannot be processed locally, the data will be transmitted to an internet gateway as Wi-Fi data 704. If the data can be processed locally, the location of the second user's Bluetooth enabled device is obtained 705. The pod then determines if the second user's Bluetooth enabled device is offline 706. If the device is offline, alternative communication options are determined 712 and the alternative communication options are then pursued 713. If the second user's Bluetooth enabled device is not offline, Bluetooth voice data is converted into Wi-Fi packets 707, the Wi-Fi packets are transmitted to the pod to which the second user's Bluetooth enabled device is connected 708. After a waiting time for a response 709, the response is processed 710, and the process ends 711.

Figure 8:
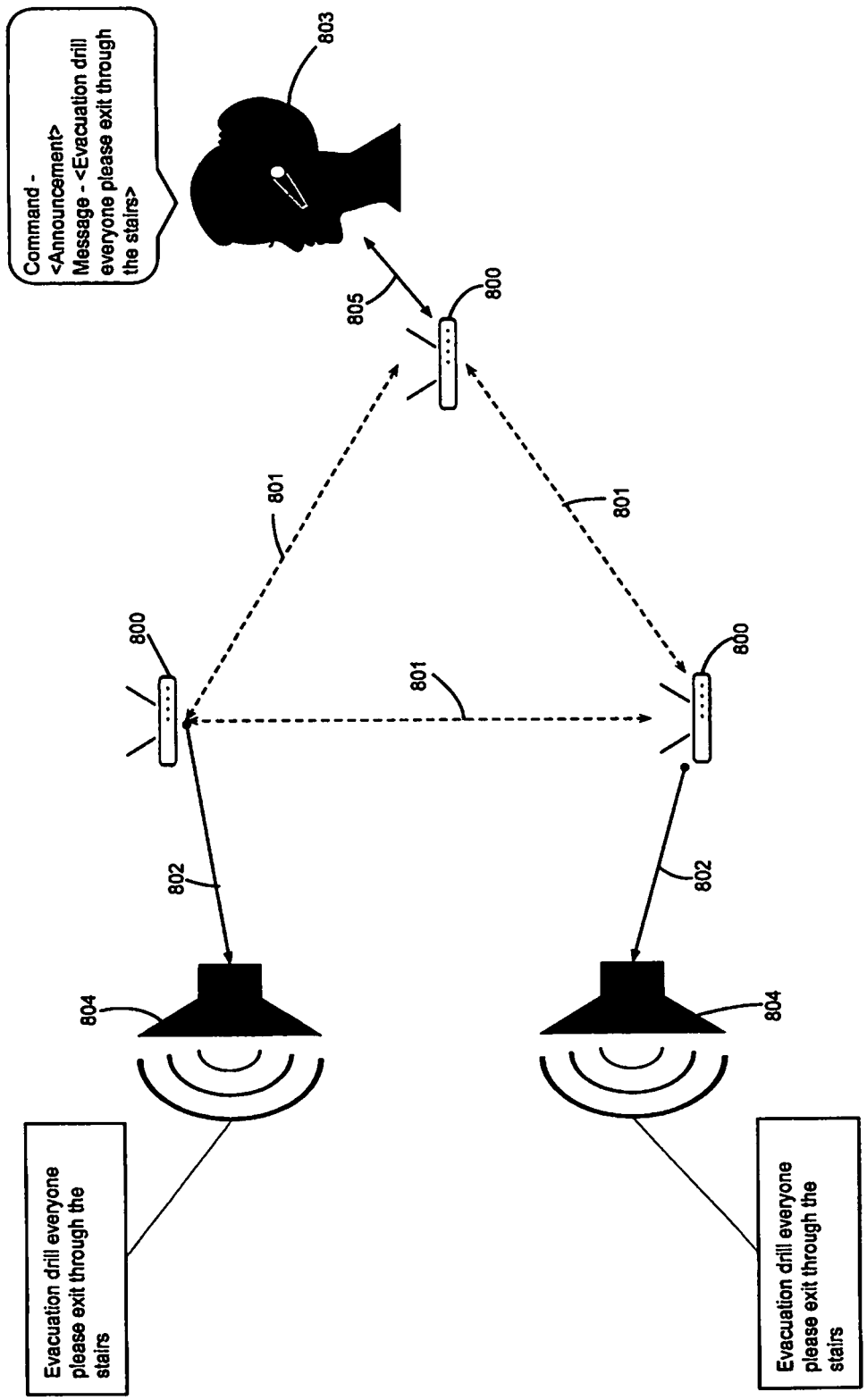
FIG. 8 illustrates an embodiment of a system wherein a user is able to access a public address system through a Bluetooth enabled device.

FIG. 8 illustrates an embodiment of the disclosed system, wherein a user having a Bluetooth enabled device 803 is able to access a public address system. In such an embodiment, a speaker 804 is coupled to a pod 800. In such embodiments, the speakers 804 may be Bluetooth enabled, or may we Wi-Fi enabled, or connected to a pod by a cable, or any other means. The speakers 804 may receive data in the form of Bluetooth packets, Wi-Fi packets, or any other means of coupling the speaker to a pod 802. In such embodiments, a user having a Bluetooth enabled device, may make an announcement over the one or more speakers 804. Depending on the Bluetooth enabled device used, the user begins the process by pushing a button or verbally saying a command, (for example, "Announcement") with the recipient <All>/<Speaker Name>, followed by the message. The voice data is received as Bluetooth packets by the pod connected to the user's Bluetooth enabled device 803. The pod 800 then converts the message from Bluetooth data to Wi-Fi data, locates the speaker, and sends the Wi-Fi data 801 to the pod 800 connected to the respective speaker 804 which outputs the announcement or message as sound.

Figure 9:
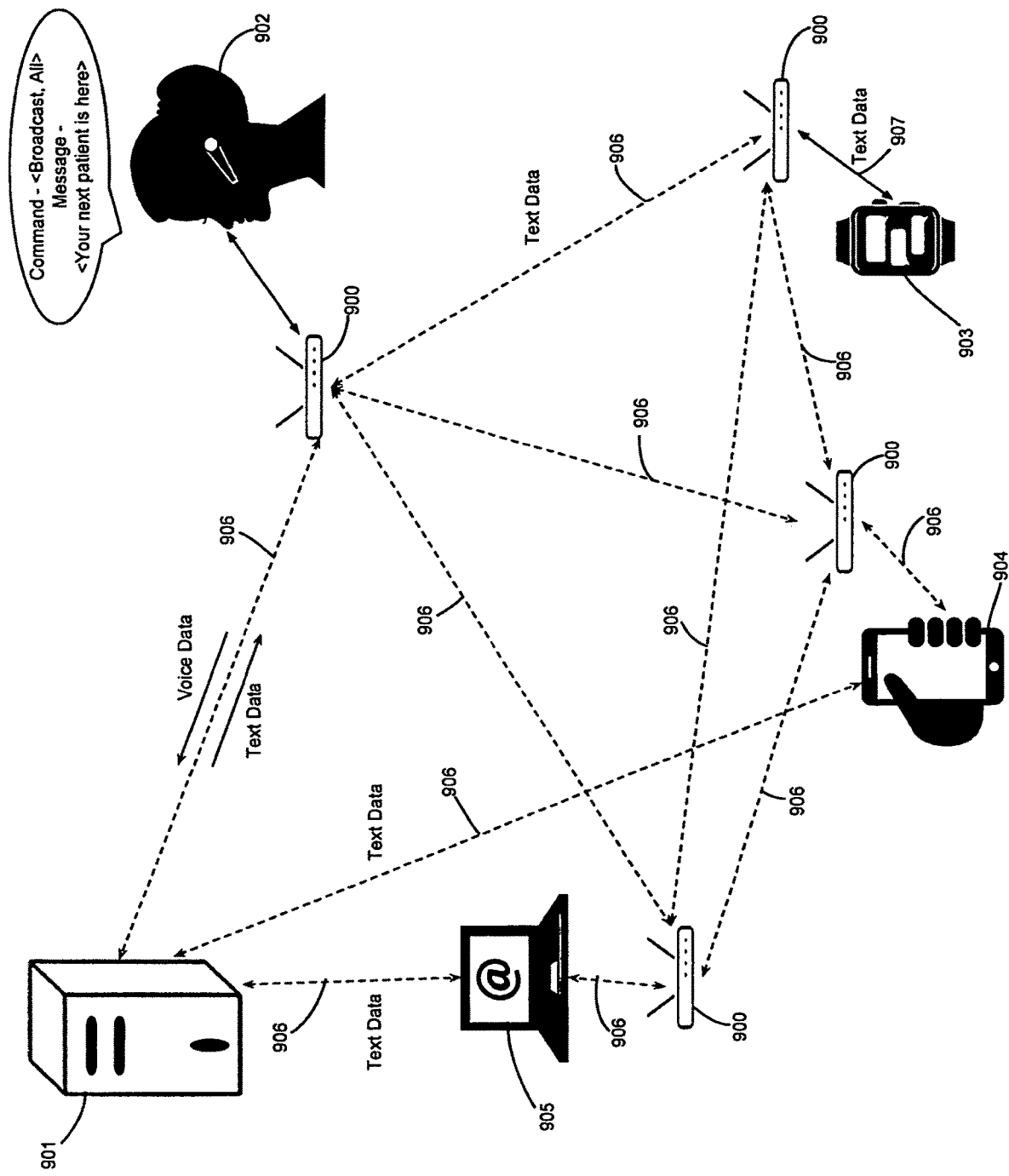
FIG. 9 illustrates an embodiment of the disclosed system wherein text data, voice data, and other data is being exchanged over the system.

FIG. 9 illustrates an embodiment of the disclosed invention wherein voice data, text data, and other data is transmitted between multiple devices. As in other embodiments, there is one or more pods 900, each pod having Bluetooth and Wi-Fi radios and capable of transmitting and receiving Bluetooth and Wi-Fi data, and each pod having a processor, memory, and computer readable instructions to carry out the disclosed methods. A user having a Bluetooth enabled device may transmit and receive voice messages from other Bluetooth devices in the network. Data can be transmitted between a Bluetooth enabled device 902 and a pod 900 via Bluetooth packets. As in other embodiments, data between pods is transmitted as Wi-Fi packets 906. The Wi-Fi data may comprise text data or voice data which can be transmitted by a user using a laptop or desktop computer 905, a smartphone 904, or a smartwatch 903. Finally, the Wi-Fi enabled devices may also be coupled to an internet gateway 901 to transmit data to be converted from voice to text. This embodiment may be used in combination with other embodiments disclosed herein, to enable users to send messages to multiple users, or to individual users.

A user having a Bluetooth enabled device connected to a pod has the option to send voice memos to one's self or all users or groups or multiple users. When using a Bluetooth enabled device connected to a pod, a user can generate a voice memo by verbally saying a command, such as "Voice Memo", followed by recipient followed by the message. This message is then sent as Bluetooth packets to the pod which then decodes the command and sends the voice memo to the recipient. The recipient may receive the voice memo via a mobile application. In such embodiments, the receiving username details are found in the address book residing on the pod.

In certain embodiments, the system is connected to an internet gateway which is capable of converting speech to text and vice versa. When a user is using a device that creates text messages (in contrast to voice) a user could type a message and then send it, provided the device is coupled to a pod or an internet gateway. In such embodiments, the text message is sent to the internet gateway. The text gets converted to voice data and is transmitted to a pod. From the pod, it is transmitted to the recipient's Bluetooth enabled device as Bluetooth packets, and the user then hears an audio message. Alternatively, the text message may be sent to a wearable device (such as a watch, or any other device worn by a user) or a smartphone, via Bluetooth or Wi-Fi packets. Certain embodiments comprise wearable Bluetooth enabled devices. These devices may be capable of sending and receiving either voice messages, text messages, or both.

Certain embodiments also include contingency features in the event a Bluetooth enabled device is turned off. In the event a Bluetooth enabled device is turned off, and a message is intended for the Bluetooth device, a user may specify an alternative form for delivery. A user can elect to receive the message by email, or text message. Users may set this preference on a user interface.

A user may also send email or text messages from a Bluetooth enabled device. In such embodiments, a user may issue a verbal command such as "email" or "text" followed by the recipient, followed by the message. The pod connected to the Bluetooth enabled device will then decode the message and if an internet gateway is available will send the necessary data to this gateway which could facilitate the speech to text conversion. Any response received is either transmitted to the pod and then to the Bluetooth enabled device or transmitted directly from the internet gateway to the recipient.

In embodiments where a voice message is being transmitted, the recipient of the voice message could have a finite amount of time to respond to the voice message that was just received, and the voice data will come back to the initiator on the same connection. Typically, this finite amount of time will be defined as N seconds. After this time has expired if the recipient has to communicate back to sender, the recipient will have to either push a button, speak a command, or take some other affirmative action to send data back to the original sender.

If a Bluetooth enabled device, that is intended to receive data is offline, the pod decodes the recipient name and searches the stored recipient directory for the recipient's other preferences for communication, which could be a voice memo to email, voice memo to a phone application, or voice message converted to text to be sent as an email/text message to phone or a text message to another Bluetooth enabled device such as an armband or watch. If there are no other viable options for communication, then the user initiating the voice message may be informed of the failure to send message and the voice message could be lost.

In the system the pods ping each other on a continuous basis to make sure that all the pods on the system are online. If for any reason one of the pods is offline or does not respond to repeated pings, then the unresponsive pod is taken off the list and the updated list is propagated to the other functioning pods. The system administrator is notified of the pod that is offline.

If a Bluetooth enabled device has moved away from a pod after an initiator of a message obtains the location of the device. The pod coupled to the initiator will receive failure message for that particular Bluetooth enabled device, and the system will attempt to resend the message. When the Bluetooth enabled device connects to the next available pod, the pod will resend the message to the new pod destination.

Administrative functions of the system are carried out over a user interface. FIG. 10 illustrates a setup view of the user interface 1000. Functions available on the user interface include adding hardware 1001, viewing a connection tree 1002, diagnosing a pod 1003, removing hardware 1004, performing software updates 1005, and updating Wi-Fi settings 1006. The USP shown in FIG. 10 is the "add hardware" feature. Bluetooth Wi-Fi pods may be added 1007, Bluetooth slave devices may be added 1008, Wi-Fi slave devices may be added 1009, and internet gateway may be added 1010.

Figure 11:
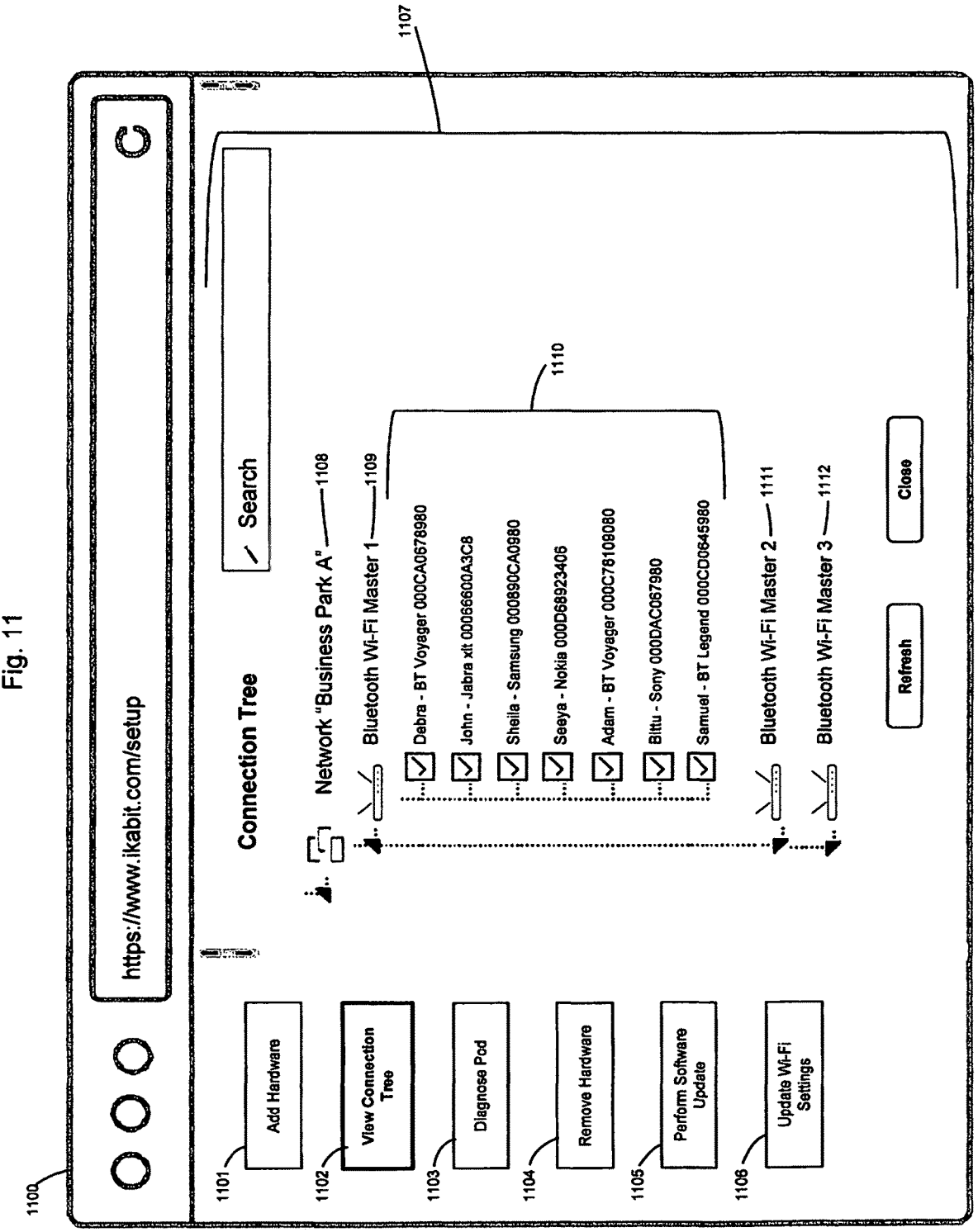
FIG. 11 illustrates an embodiment of a user interface showing a connection tree of each device on a network.

FIG. 11 illustrates a user interface 1100 showing the connection tree 1107. Each Bluetooth device 1110 coupled to Pod 1 1109 is shown. Users may click on Bluetooth Wi-Fi Pod 2 1111 or Bluetooth Wi-Fi Pod 3 1112 to view devices coupled to those pods as well.

Figure 12:
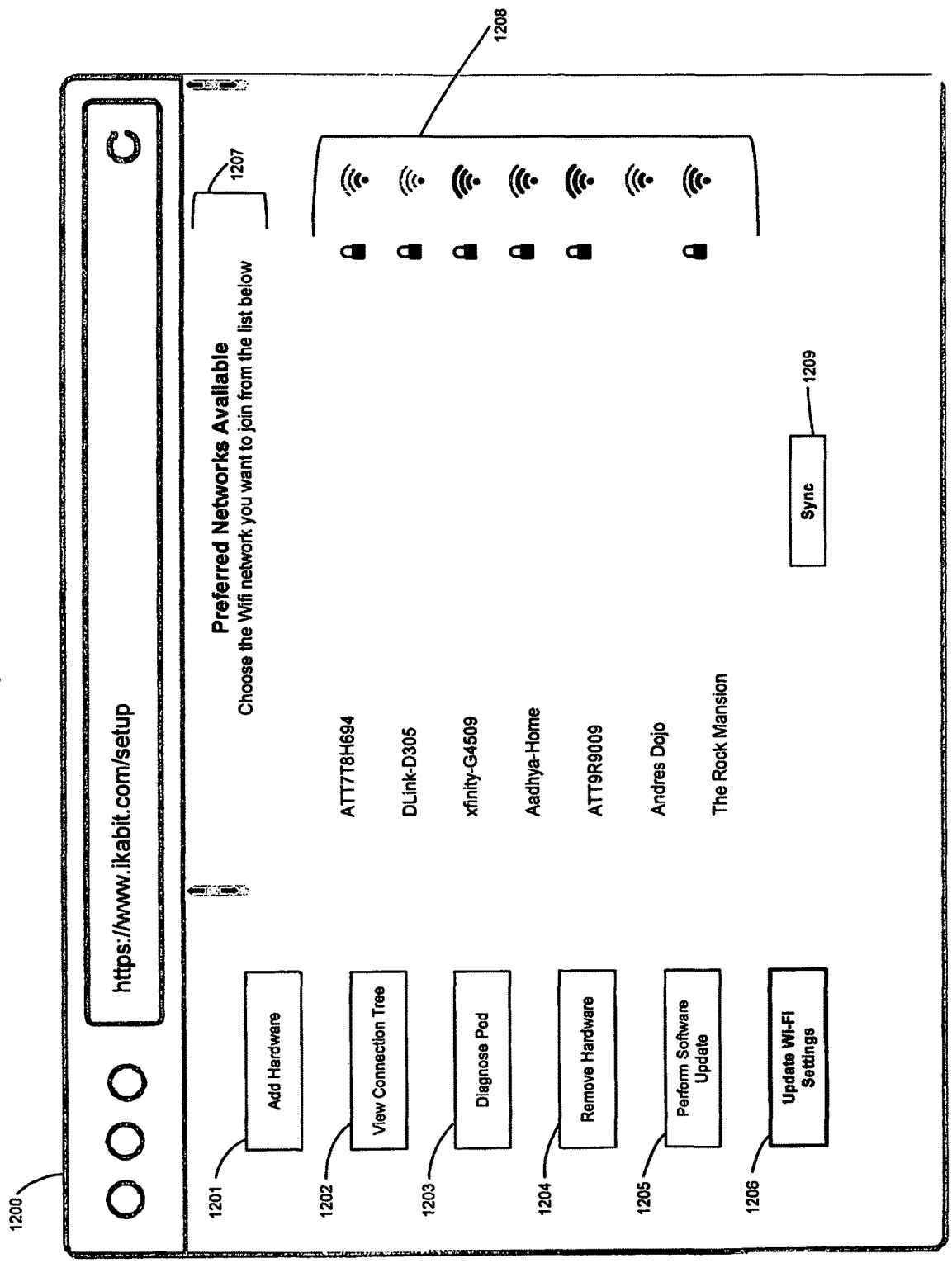
FIG. 12 illustrates an embodiment of a user interface showing available networks to which the Wi-Fi pods can connect.

FIG. 12 illustrates a user interface 1200 showing preferred networks available 1207, and giving the user the ability to select a specific network to join 1208. The user interface can be used to carry out other functions, including, sending text messages or prerecorded voice messages, verifying the status of the system, and diagnosing problems with a given pod or pods. The user interface 1200 depicted has particular utility when updating pod settings when the network Wi-Fi configuration is changed. In certain embodiments, the user interface 1200 can also be used to update software on the pods.

User interfaces may be accessible on desktop computing devise, tablets, smartphones, smartwatches, and other electronic devices. In certain embodiments, users may use the user interface to control appliances, establish settings, and receive alerts. Additionally, users may use the user interface to select parameters in which an alert will be transmitted to a user when an specified event occurs. For example, a user may use the user interface to create a setting wherein an alert would be generated after an oven has been on or at a specified temperature for a specified period of time. When embodiments including appliances comprise a user interface, users may add appliances to the system, remove appliances from the system, establish settings for a given appliance, select alert preferences for specified appliances, select other users who may receive alerts, control functions of an appliance, and receive data (such as temperature, operating or running time, etc.) from a given appliance.

Embodiments of this system are useful in any setting where hands-free communication is desired. Examples include uses in office spaces, where a front reception desk needs to communicate with others. Other settings where this system would have particular utility include, but are not limited to, healthcare settings, hotels to communicate with staff or housekeeping that are far away from front desk, stadiums and other large event venues, and restaurants where the kitchen can appraise waiters on the status of an order or for hostess to let the waiting customers know that their table is ready. In certain embodiments, the Bluetooth enabled device may be an armband, a headset, or any other device capable of sending and receiving Bluetooth packets.

Of particular utility, is a wireless computer system wherein data is transmitted between users and appliances. Certain embodiments of the system architecture may comprise any of the features disclosed herein. When communicating with an appliance, a user may utilize a Bluetooth or Wi-Fi enabled device. In certain embodiments, a desktop computer may also be utilized.

FIGS. 13-16 illustrate embodiments of a system wherein Wi-Fi and Bluetooth packets are used to transmit data between users and appliances. In such embodiments, similar system architecture is used, as previously disclosed, and data may be transmitted without voice data.

In FIG. 13, a washer is used as an exemplary appliance 1305. This is for example only; the appliance may be a washer, or any other appliance, including, but not limited to, a washer, dishwasher, dryer, oven, stove, furnace, heater, water heater, microwave, or a cooking appliance such as a slow cooker or a rice cooker. In such embodiments of the system, the appliance will comprise, or be coupled to, one or more of the following: a Bluetooth radio, a Wi-Fi radio, a processor, and computer readable media having computer readable instructions encoding the steps for one or more of the methods disclosed herein.

FIG. 13 depicts a user 1306, having a smartwatch 1307. In this illustration, the smartwatch is a Bluetooth enabled and Wi-Fi enabled device. Although the embodiment of the smartwatch illustrated includes both Bluetooth and Wi-Fi capabilities, in alternative embodiments, a device may comprise only Bluetooth or Wi-Fi capabilities. Additionally, the smartwatch 1307 may be substituted with any wearable wireless communication device, provided the wearable wireless communication device has either Wi-Fi or Bluetooth enablement, or is enabled to send and receive both Wi-Fi and Bluetooth signals. The user 1306 is in a first room 1301 and the appliance 1305 is in a second room 1302. The smartwatch 1307 is able to send and receive Wi-Fi packets 1308 to and from the appliance 1305. The embodiment illustrated comprises a first pod 1303 and a second pod 1304. The user's 1306 smartwatch 1307 is able to send and receive Bluetooth packets 1311 from the first pod 1303. The first pod 1303 converts Bluetooth packets 1311 received from the user 1306 into Wi-Fi packets 1309, which are then transmitted to the second pod 1304. The second pod then transmits Wi-Fi 1310 to the appliance 1305. The Appliance can transmit Wi-Fi packets 1308 to the user's 1306 smartwatch 1307, or it may transmit Wi-Fi packets 1310 to the second pod 1304, the second pod 1304 will then transmit Wi-Fi packets to the first pod 1303. The first pod 1303 will convert the Wi-Fi packets 1309 to Bluetooth packets 1311 and transmit the Bluetooth packets 1311 to the user's 1306 smartwatch 1307. In this embodiment, the appliance 1305 is only capable of sending and receiving Wi-Fi packets, but in alternative embodiments, the appliance may be capable of sending and receiving only Bluetooth packets, or the appliance 1305 may be capable of sending and receiving both Wi-Fi and Bluetooth packets. Although the user 1306 is illustrated as having a smartwatch 1307, a device having Bluetooth or Wi-Fi enablement may be substituted. Examples of functionality of the illustrated embodiment include the user 1306 sending a command to a washer to begin its cycle, and the appliance 1305 sending a notification to the user 1306 that the cycle is complete. Additionally, an appliance may be able to transmit a packet indication current temperature or time remaining in a cycle. In such embodiments, a user 1306 would send a command or receive an alert on his or her Bluetooth or Wi-Fi enabled device. In the event that the smartwatch 1307 is not able to receive Wi-Fi packets, the system can route this data to one of more pods, where the data will be converted to Bluetooth packets and transmit these Bluetooth Packets to the smartwatch 1307.

Figure 14:
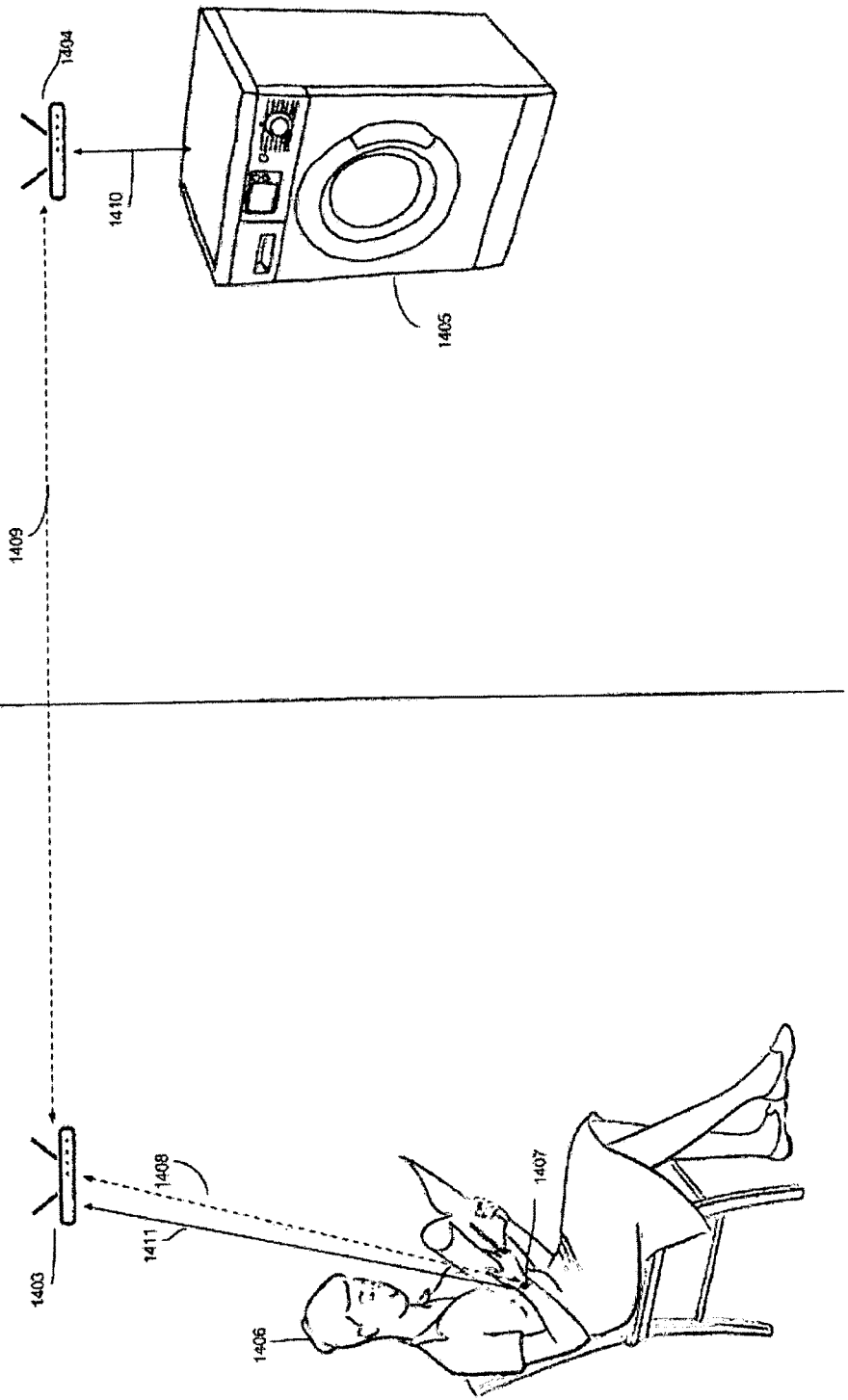
FIG. 14 illustrates an embodiment of a system, wherein data is transmitted between a user and an appliance, wherein a user is transmitting data to the appliance via two pods.

FIG. 14 illustrates a similar embodiment as illustrated in FIG. 13. A user 1406 is in a first room 1401 and an appliance 1405, is in a second room 1402. A user 1406 has a smartwatch 1407 that is able to send and receive Bluetooth packets 1411 and Wi-Fi packets 1408. In the embodiment illustrated in FIG. 14, no packets are transmitted directly between the user's smartwatch 1407 and the appliance 1405. The user's smartwatch 1407 sends and receives Bluetooth packets 1411 and Wi-Fi packets 1408 from a first pod 1403. When the first pod 1403 receives Wi-Fi packets 1409 from the second pod 1404, it either sends Wi-Fi packets 1408 to the smartwatch 1407 or converts the Wi-Fi packets 1409 from the second pod 1404 to Bluetooth packets 1411 and transmits the Bluetooth packets to the smartwatch 1407. The second pod 1404 sends and receives Bluetooth packets 1410 to and from the appliance 1405. The second pod 1404 will convert inbound Wi-Fi packets 1409 to outbound Bluetooth packets 1410 and convert inbound Bluetooth packets 1410 to outbound Wi-Fi packets 1409. This embodiment illustrates an appliance 1405 that is capable of sending and receiving only Bluetooth packets 1410.

Figure 15:
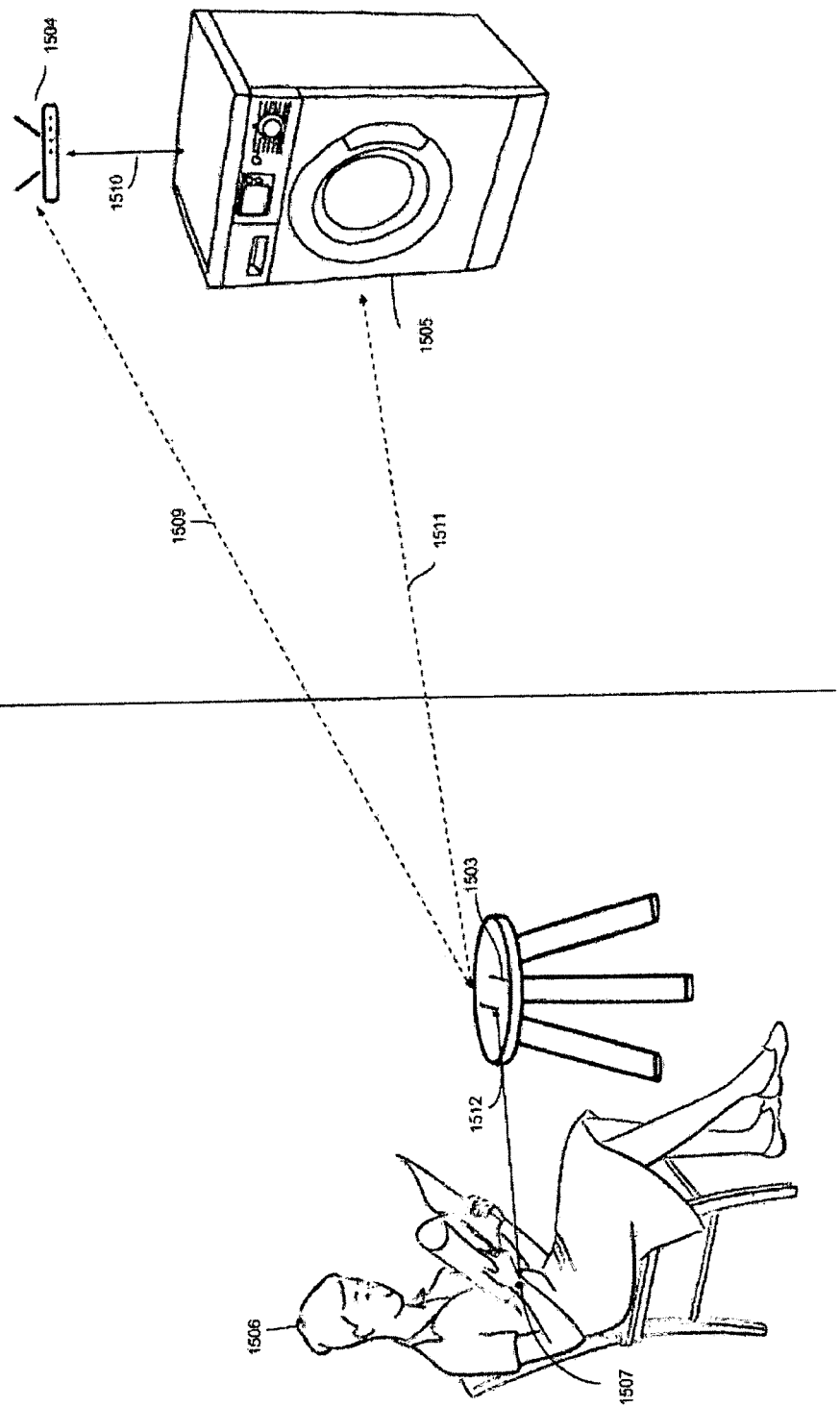
FIG. 15 illustrates an embodiment of a system wherein data is transmitted between a user and an appliance, via a smart watch, through a smart phone, and optionally, through a pod/

FIG. 15 illustrates a similar system, as previously disclosed, but includes a smartphone 1503. A user 1506 having a smartwatch 1507 is in a first room 1501. A smartphone 1503 is located in the first room 1501. The smartphone 1503 sends and receives Bluetooth packets 1512 to and from the smartwatch 1507. The smartphone 1503 converts inbound Wi-Fi packets 1509 1511 from the pod 1504 and the appliance 1505 to Bluetooth packets 1512 and transmits the Bluetooth packets to the smartwatch 1507. The smartphone 1503 also converts inbound Bluetooth packets 1512 from the smartwatch 1507 to Wi-Fi packets 1509 1511 to be transmitted to the pod 1504 and to the appliance 1505. An appliance 1505 and a pod 1504 are located in a second room 1502. In the depicted embodiment, the appliance 1505 is capable of sending and receiving both Wi-Fi packets 1511 and Bluetooth packets 1510. The pod 1504 sends and receives Wi-Fi packets 1509 from the smartphone 1503. Inbound Wi-Fi packets 1503 are converted to Bluetooth packets 1510 by the pod 1504 and transmitted to the appliance 1505. Similarly, inbound Bluetooth packets 1510 are converted to Wi-Fi packets 1509 and transmitted to the smartphone 1503.

FIG. 16 illustrates an embodiment of a system wherein a user 1603 is given an alert 1613 and may transmit a command to an appliance 1606. By way of example, and not limitation, the appliance 1606 depicted is an oven, but the appliance could be any appliance. The user 1603 is in a first room 1601. Also in the first room 1601 is a first pod 1604. In this illustration, the appliance 1606 has transmitted Bluetooth packet 1610 indicating the period of time, specified on a timer, has elapsed. A second pod 1605 converts the Bluetooth packets 1610 to Wi-Fi packets 1609 and transmits them to the first pod 1604 The second pod then transmits either Wi-Fi packets 1608 or Bluetooth packets 1611 to the user's 1603 smartwatch 1607. The smartwatch 1607 is for example only, and any device having at least one of either Bluetooth or Wi-Fi enablement may be substituted. The packets transmitted to the smartwatch 1607 encode a message 1613 and allow the user to transmit a command to turn off the oven, or to leave the oven on 1613. When the user 1603 selects the desired command on the smartwatch 1607, the smartwatch 1607 will either transmit Bluetooth packets 1611 or Wi-Fi packets 1608 to the first pod 1604. If necessary, the first pod 1604 will convert Bluetooth 1611 packets to Wi-Fi packets 1609. The Wi-Fi packets 1609 are then transmitted to the second pod 1605. The second pod 1605 will then convert the Wi-Fi packets to Bluetooth packets 1610 and transmit these packets to the appliance 1606. The appliance 1606 will then execute the command. In this instance the oven will either turn off, or remain on.

There is other functionality that may be carried out with appliances. If a device is out of range of a pod, the system may generate text messages or email alerts when a user should be alerted to an occurrence related to an appliance. Users may establish such settings through the system user interface.

Additionally, users may set certain actions to occur, based on the proximity of a device to an appliance or pod. For example, an appliance may shut down when a user's device, such as a smartphone or smartwatch, are not within range of the appliance or pod. Similarly, an appliance may start when an user is in range. This has utility as both a safety feature and energy saving feature. For instance, if a user is out of range, and an oven or stove are left on, these appliances may shut down for safety. Similarly, if a user is out of range of a pod or a furnace (for instance, if a user is outside of a house and the house is unoccupied), the system can shut down the furnace to conserve energy.

While the invention has been described and illustrated with reference to certain particular embodiments thereof, those skilled in the art will appreciate that the various adaptations, changes, modifications, substitutions, deletions, or additions or procedures and protocols may be made without departing from the spirit and scope of the invention. It is intended, therefore, that the invention be defined by the scope of the claims that follow and that such claims be interpreted as broadly as reasonable.

What is claimed is:

1. An appliance comprising:
    a processor;
    a non-transitory computer readable media encoding computer readable instructions for carrying out a method of transmitting data over a wireless computer system; and
    a Bluetooth or a Wi-Fi radio, or a Bluetooth radio and a Wi-Fi radio;
    wherein the appliance is coupled to a wireless computer system, said wireless computer system comprising:
        a first pod, wherein the first pod comprises:
            a processor;
            a non-transitory computer readable media;
            a non-transitory address book comprising a list of users and user devices able to send or receive data on the system;
            a Bluetooth radio; and
            a Wi-Fi radio;
        a second pod, wherein the second pod comprises:
            a processor;
            non-transitory computer readable media;
            a non-transitory address book comprising a list of users and user devices able to send or receive data on the system;
            a Bluetooth radio; and
            a Wi-Fi radio; and
        a first wireless communication device, wherein the first wireless communication device comprises a Bluetooth radio or a Wi-Fi Radio, or a Bluetooth radio and a Wi-Fi Radio;
    wherein data is transmitted to a user over the wireless computer system according to a method comprising the steps of:
        transmitting Wi-Fi packets from the appliance to the second pod;
        transmitting Wi-Fi packets from the second pod to the first pod;
        converting the Wi-Fi packets that were transmitted from the second pod to the first pod into Bluetooth packets;
        transmitting Bluetooth packets from the first pod to the first wireless communication device; and
        generating a visual or audio alert on the first wireless communication device.

2. The appliance of claim 1 wherein data is transmitted to a user over the wireless computer system according to a method comprising the steps of:
    receiving a command input from a user through a first wireless communication device;
    converting the command input into Bluetooth packets;
    transmitting the Bluetooth packets from the first wireless communication device to the first pod;
    converting the Bluetooth packets transmitted from the first wireless communication device to the first pod to Wi-Fi packets;
    transmitting the converted Wi-Fi packets from the first pod to the second pod;
    transmitting the Wi-Fi packets from the second pod to the appliance; and
    executing the command received from the user through the first wireless communication device.

3. The appliance of claim 2 wherein the command input from a user through a first wireless communication device is a voice command.

4. The appliance of claim 2 wherein the command input is an instruction to begin a cycle.

5. The appliance of claim 1 wherein data is transmitted to a user over the wireless computer system according to a method comprising the steps of:
    transmitting first Wi-Fi packets from the appliance to the first wireless communication device;
    generating a visual or audio alert on the first wireless communication device;
    receiving a command input from a user through a first wireless communication device;
    converting the command input into second Wi-Fi packets;
    transmitting second Wi-Fi packets to the appliance; and
    executing the command input received from the user.

6. The appliance of claim 5 wherein the command input from a user through a first wireless communication device is a voice command.

7. The appliance of claim 5 wherein the command input is an instruction to begin a cycle.

8. The appliance of claim 1 wherein data is transmitted to a user over the wireless computer system according to a method comprising the steps of:
    transmitting Bluetooth packets from the appliance to the second pod;
    converting the Bluetooth packets from the second pod to Wi-Fi packets;

transmitting the Wi-Fi packets from the second to the first pod;
transmitting the Wi-Fi packets from the first pod to the first wireless communication device;
generating a visual or audio alert on the first wireless communication device.

9. The appliance of claim 1 wherein data is transmitted to a user over the wireless computer system according to a method comprising the steps of:
transmitting first Bluetooth packets from the appliance to the second pod;
converting the Bluetooth packets from the second pod to Wi-Fi packets;
transmitting the Wi-Fi packets from the second to the first pod;
converting the Wi-Fi packets to second Bluetooth packets;
transmitting the second Bluetooth packets from the first pod to the first wireless communication device; and
generating a visual or audio alert on the first wireless communication device.

10. The appliance of claim 1 wherein data is transmitted to a user over the wireless computer system according to a method comprising the steps of:
receiving a command input from a user through a first wireless communication device;
converting the command input into first Bluetooth packets;
transmitting the first Bluetooth packets from the first wireless communication device to the first pod;
converting the first Bluetooth packets transmitted from the first wireless communication device to the first pod to Wi-Fi packets;
transmitting the converted Wi-Fi packets from the first pod to the second pod;
converting the Wi-Fi packets transmitted from the first pod into second Bluetooth packets;
transmitting the second Bluetooth packets from the second pod to the appliance; and
executing the command received from the user through the first wireless communication device.

11. The appliance of claim 10 wherein the command input from a user through a first wireless communication device is a voice command.

12. The appliance of claim 10 wherein the command input is an instruction to begin a cycle.

13. The appliance of claim 1 wherein data is transmitted to a user over the wireless computer system according to a method comprising the steps of:
receiving a command input from a user through a first wireless communication device;
converting the command input into Wi-Fi packets;
transmitting the Wi-Fi packets from the first wireless communication device to the first pod;
transmitting the Wi-Fi packets from the first pod to the second pod;
converting the Wi-Fi packets transmitted from the first pod to Bluetooth packets;
transmitting the Bluetooth packets from the second pod to the appliance; and
executing the command received from the user through the first wireless communication device.

14. The appliance of claim 13 wherein the command input is an instruction to begin a cycle.

15. The appliance of claim 13 wherein the command input from a user through a first wireless communication device is a voice command.

16. The appliance of claim 1 wherein data is transmitted to a user over the wireless computer system according to a method comprising the steps of:
transmitting Wi-Fi packets from the appliance to the second pod;
transmitting the Wi-Fi packets from the second to the first pod;
transmitting the Wi-Fi packets from the first pod to the first wireless communication device;
generating a visual or audio alert on the first wireless communication device.

17. The appliance of claim 1 wherein data is transmitted to a user over the wireless computer system according to a method comprising the steps of:
receiving a command input from a user through the first wireless communication device;
converting the command input into first Wi-Fi packets;
transmitting the first Wi-Fi packets from the first wireless communication device to the first pod;
transmitting the first Wi-Fi packets from the first pod to the second pod;
transmitting the first Wi-Fi packets from the second pod to the appliance; and
executing the command received from the user through the first wireless communication device.

18. The appliance of claim 17 wherein the command input from a user through a first wireless communication device is a voice command.

19. The appliance of claim 17 wherein the command input is an instruction to begin a cycle.

20. A system for wireless communication comprising:
an appliance, where in the appliance comprises:
a processor;
a non-transitory computer readable media encoding computer readable instructions for carrying out a method of transmitting data over a wireless computer system; and
a Bluetooth or a Wi-Fi radio, or a Bluetooth radio and a Wi-Fi radio;
a first pod, wherein the first pod comprises:
a processor;
a non-transitory computer readable media;
a non-transitory address book comprising a list of users and user devices able to send or receive data on the system;
a Bluetooth radio; and
a Wi-Fi radio;
a second pod, wherein the second pod comprises:
a processor;
non-transitory computer readable media;
a non-transitory address book comprising a list of users and user devices able to send or receive data on the system;
a Bluetooth radio; and
a Wi-Fi radio; and
a first wireless communication device, wherein the first wireless communication device comprises a Bluetooth radio or a Wi-Fi Radio, or a Bluetooth radio and a Wi-Fi radio;
wherein data is transmitted to a user over the wireless communication system according to a method comprising the steps of:
transmitting Wi-Fi packets from the appliance to the second pod;
transmitting Wi-Fi packets from the second pod to the first pod;

converting the Wi-Fi packets that were transmitted from the second pod to the first pod into Bluetooth packets;

transmitting Bluetooth packets from the first pod to the first wireless communication device; and generating a visual or audio alert on the first wireless communication device.

21. The system for wireless communication of claim 20 wherein data is transmitted to a user over the wireless communication system according to a method comprising the steps of:

receiving a command input from a user through a first wireless communication device;

converting the command input into Bluetooth packets;

transmitting the Bluetooth packets from the first wireless communication device to the first pod;

converting the Bluetooth packets transmitted from the first wireless communication device to the first pod to Wi-Fi packets;

transmitting the converted Wi-Fi packets from the first pod to the second pod;

transmitting the Wi-Fi packets from the second pod to the appliance; and executing the command received from the user through the first wireless communication device.

22. The system for wireless communication of claim 20 wherein data is transmitted to a user over the wireless communication system according to a method comprising the steps of:

transmitting first Wi-Fi packets from the appliance to the first wireless communication device;

generating a visual or audio alert on the first wireless communication device;

receiving a command input from a user through a first wireless communication device;

converting the command input into second Wi-Fi packets;

transmitting second Wi-Fi packets to the appliance; and executing the command input received from the user.

23. The system for wireless communication of claim 22 wherein the command input from a user through a first wireless communication device is a voice command.

24. The system for wireless communication of claim 20 wherein data is transmitted to a user over the wireless communication system according to a method comprising the steps of:

transmitting Bluetooth packets from the appliance to the second pod;

converting the Bluetooth packets from the second pod to Wi-Fi packets;

transmitting the Wi-Fi packets from the second to the first pod;

transmitting the Wi-Fi packets from the first pod to the first wireless communication device;

generating a visual or audio alert on the first wireless communication device.

25. The system for wireless communication of claim 20 wherein data is transmitted to a user over the wireless communication system according to a method comprising the steps of:

transmitting first Bluetooth packets from the appliance to the second pod;

converting the Bluetooth packets from the second pod to Wi-Fi packets;

transmitting the Wi-Fi packets from the second to the first pod;

converting the Wi-Fi packets to second Bluetooth packets;

transmitting the second Bluetooth packets from the first pod to the first wireless communication device; and generating a visual or audio alert on the first wireless communication device.

26. The system for wireless communication of claim 20 wherein data is transmitted to a user over the wireless communication system according to a method comprising the steps of:

receiving a command input from a user through a first wireless communication device;

converting the command input into first Bluetooth packets;

transmitting the first Bluetooth packets from the first wireless communication device to the first pod;

converting the first Bluetooth packets transmitted from the first wireless communication device to the first pod to Wi-Fi packets;

transmitting the converted Wi-Fi packets from the first pod to the second pod;

converting the Wi-Fi packets transmitted from the first pod into second Bluetooth packets;

transmitting the second Bluetooth packets from the second pod to the appliance; and executing the command received from the user through the first wireless communication device.

27. The system for wireless communication of claim 26 wherein the command input from a user through a first wireless communication device is a voice command.

28. The system for wireless communication of claim 20 wherein data is transmitted to a user over the wireless communication system according to a method comprising the steps of:

receiving a command input from a user through a first wireless communication device;

converting the command input into Wi-Fi packets;

transmitting the Wi-Fi packets from the first wireless communication device to the first pod;

transmitting the Wi-Fi packets from the first pod to the second pod;

converting the Wi-Fi packets transmitted from the first pod to Bluetooth packets;

transmitting the Bluetooth packets from the second pod to the appliance; and executing the command received from the user through the first wireless communication device.

29. The system for wireless communication of claim 28 wherein the command input from a user through a first wireless communication device is a voice command.

30. The system for wireless communication of claim 20 wherein data is transmitted to a user over the wireless communication system according to a method comprising the steps of:

transmitting Wi-Fi packets from the appliance to the second pod;

transmitting the Wi-Fi packets from the second to the first pod;

transmitting the Wi-Fi packets from the first pod to the first wireless communication device; and generating a visual or audio alert on the first wireless communication device.

31. The system for wireless communication of claim 20 wherein data is transmitted to a user over the wireless communication system according to a method comprising the steps of:

receiving a command input from a user through the first wireless communication device;

converting the command input into first Wi-Fi packets;

transmitting the first Wi-Fi packets from the first wireless communication device to the first pod;
transmitting the first Wi-Fi packets from the first pod to the second pod;
transmitting the first Wi-Fi packets from the second pod to the appliance; and
executing the command received from the user through the first wireless communication device.

32. The system for wireless communication of claim 31 wherein the command input is an instruction to begin a cycle.

\* \* \* \* \*